Aug. 20, 1963    J. A. WHITE, JR., ET AL    3,101,093
PRESSURE LIMITING VALVE
Filed Dec. 26, 1961

INVENTORS
John A. White, Jr.
Rex W. Vaughan
Webster & Webster
ATTYS.

United States Patent Office 3,101,093
Patented Aug. 20, 1963

3,101,093
PRESSURE LIMITING VALVE
John A. White, Jr., and Rex W. Vaughan, Gilroy, Calif., assignors to Be-Ge Manufacturing Co., Gilroy, Calif., a corporation of California
Filed Dec. 26, 1961, Ser. No. 161,953
5 Claims. (Cl. 137—316)

This invention relates to a pressure limiting valve for use in connection with a hydraulic pressure system, and particularly to a valve unit designed to be interposed between the pressure-creating pump of a tractor, and the rams or other hydraulic devices of an implement or the like connected in draft relation with the tractor.

On certain tractors, the hydraulic pump, which is part of the standard equipment of any such tractor, produces a certain p.s.i. (such as 2500), which is sometimes much too high for the rams etc. on the towed implement to utilize without possible damage being done to the cylinders of the rams, and to the fluid-conducting hoses leading to the same.

It is therefore the major object of this invention to provide a valve unit, adapted to be interposed in the lines between the pump and rams, by means of which the pressure of the fluid fed to the rams may be limited considerably from the maximum or normal supplied by the pump, so that the rams may be operated at whatever pressure is best for their needs.

There is usually a double-acting ram to be controlled, and two high-pressure conduits lead from the pump to the ram via a control valve. It is therefore another object of this invention to provide a valve unit which includes two separate relief valves, one for each such conduit, and to provide a means for adjusting both relief valves simultaneously and to the same extent as may be desired, so that the pressure-limiting setting of both valves will always be the same, and the adjusting operation is simplified Under certain conditions, however, it may be desirable to pass the maximum pressure through the valve unit, and a further object of the invention is to provide easily actuated means whereby both pressure-limiting valves of the unit may be rendered inoperative.

Each such tractor includes, as a standard part of the hydraulic system thereof, a rear-end bracket fixed on the tractor and to which the conduits from the pump and control valve are connected, and two blocks removably secured to the bracket and to which the conduits leading to the rams or the like are connected; the bracket and blocks having passages therethrough to communicate with the respective conduits.

In connection with the above feature of standard construction, it is therefore another object of this invention to arrange the pressure limiting valve unit so that it may be interposed between the bracket and blocks merely by disconnecting the same from each other without having to change or remodel said bracket and blocks, or the conduits attached thereto, in any way; the valve unit being clamped between the bracket and blocks so that a rigid entity is then provided.

It is also an object of this invention to provide a pressure limiting valve which is designed for ease and economy of manufacture.

An additional object of the invention is to provide a practical, reliable, and durable pressure limiting valve, and one which will be exceedingly effective for the purpose for which it is designed.

These objects are accomplished by means of such structure and relative arrangement of parts as will fully appear by a perusal of the following specification and claims.

In the drawings:
FIG. 1 is a rear end elevation of the pressure limiting valve as mounted in position on the supporting bracket; certain parts being broken out and in section.

Figure 1:
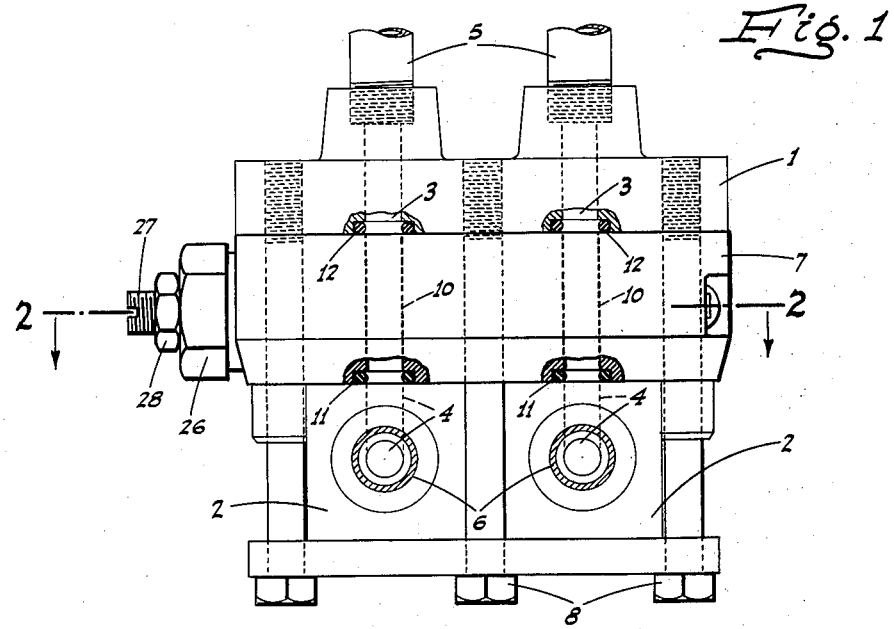
Figure 2:
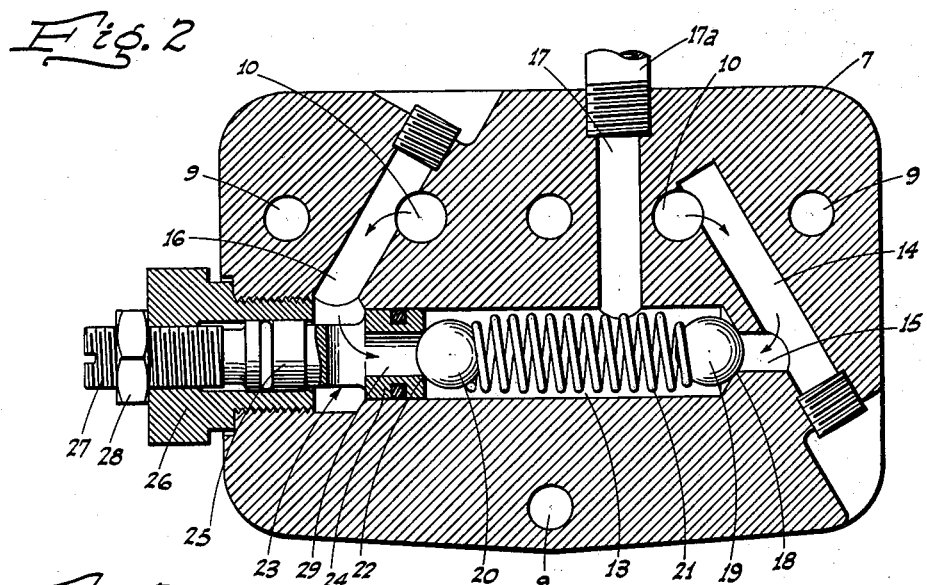
FIG. 2 is an enlarged sectional plan view of the valve substantially on line 2—2 of FIG. 1, showing the valve in its operative condition.

Referring now more particularly to the drawings, and to the characters of reference marked thereon, the pressure limiting valve which is the subject of this invention is particularly designed to be mounted in connection with the horizontal rearwardly projecting bracket plate 1 disposed at the rear end of tractors of a certain make, and against the under side of which plate blocks 2 are normally detachably bolted. The plate 1 is provided with a pair of transversely spaced vertical passages 3 therethrough, while the blocks 2 are provided with L-shaped passages 4 therein, the upper portions of which aline with the lower ends of passages 3; the lower portions of said passages 4 opening to the rear face of the blocks 2, as indicated in FIG. 1.

Conduits 5, leading from the pressure side of the high-pressure hydraulic pump on the tractor via the control valve are connected to plate 1 and communicate with passages 3, as indicated. Other conduits 6 are connected to the blocks 2 in communication with the rear ends of passages 4 and lead to the rams or other mechanisms to be actuated, and which as usual are mounted on the implement connected in draft relation to the tractor. It will therefore be seen that when the plate 1 and blocks 2 are directly connected together, as is ordinarily the case, the full pressure from the conduits 5 is fed undisturbed to the conduits 6 and to the rams.

The improved pressure limiting valve, which normally allows a limit pressure only to be supplied to the conduits 6, comprises a horizontal body or block 7, of substantially the same shape and dimensions in plan as the plate 1, disposed between said plate 1 and blocks 2 after such plate and blocks are separated from each other by the withdrawal of the holding bolts therefrom. The plate 1, body 7, and blocks 2 are then firmly clamped together by similar but longer bolts 8 which take the place of the original bolts, the body 7 being provided with bolt holes 9 which aline with those already in the plate 1 and blocks 2. The body 7 is also provided with passages 10 therethrough which aline with passages 3 and 4. Sealing rings 11 are mounted in the body 7 at the lower end of the passages 10; the plate 1 already having similar rings 12 about the lower end of passages 3, so that a leak-proof continuity of passages 3, 10, and 4 is assured.

The body 7 is formed with a horizontal bore 13 providing an enclosed chamber which extends transversely of the body rearwardly of passages 10. A bypass passage 14 extends from one passage 10 intermediate its ends to one end of the bore 13; said passage 14 including a portion 15 disposed axially of and materially smaller in diameter than said bore. Another bypass passage 16 extends from the other passage 10 to the periphery of the bore 13 at the opposite end thereof. A return passage 17 leads from the bore 13 intermediate its ends to one side of the body, where said passage is connected to a conduit 17a leading to the fluid reservoir of the hydraulic system of the tractor.

The junction of the bore 13 and passage portion 15 forms a valve seat 18 for a ball valve 19 in and of smaller diameter than said bore 13. A similar ball valve 20 is disposed in bore 13 in spaced relation to the valve 19; the valves being yieldably maintained in such relation by a compression spring 21 engaging and extending between said valves.

The ball valve 20 is engaged on its face opposite the spring 21 in a valve seat 22 formed in the adjacent end of a plunger, indicated generally at 23, which extends axially of the bore 13 in a direction away from the spring 21. The plunger 23 includes a cylindrical head 24 at one end in which the valve seat 22 is formed, and having a close slidable fit in the bore 13 just beyond the passage 16 in the direction of said one end of the bore.

At its other end, which is beyond the bore and the passage 16, the plunger 23 is formed with an outer-end head 25 having a pressure tight sliding fit in a bushing 26. This bushing is removably threaded into and projects from the adjacent end of the body for removal when necessary. An axially adjustable set screw 27 is threaded into and projects from the outer end of the bushing for adjustment, said set screw at its inner end being rigid or integral with the adjacent end of the plunger; a lock nut 28 on the set screw engaging the bushing to prevent undesired movement of the set screw. By the above described means, the plunger may be easily advanced or retracted as may be desired, without any possibility of the plunger "chattering" when the unit is in operation.

The plunger head 24 and the adjacent portion of the plunger, but not the head 25, are formed with an internal passage 29 open to the valve seat end of the plunger and to the periphery of the plunger between the heads 24 and 25 and communicating with the passage 16.

By reason of the above described valve construction, it will be seen that the compression of the spring 21, and the pressure holding the ball valves seated in their respective seats, may be adjusted to suit conditions by advancing or retracting the set screw 27. If, for instance, the normal output pressure of the fluid in the conduits 3 is 2500 p.s.i., and the spring 21 is set to resist 1000 p.s.i., pressure fluid limited to 1000 p.s.i. will be passed through conduits 6 to the rams or other works. If resistance of rams is great enough to cause p.s.i. to go over 1000 the fluid will then be returned to the reservoir through passage 17 and conduit 17a. Since both ball valves are engaged by the one spring 21, both valves will open at the same pressure, as will be evident, and only the one set screw 27 is required to set both valves to resist any pressure desired, and which may be from 1000 to 1800 p.s.i.

Figure 3:
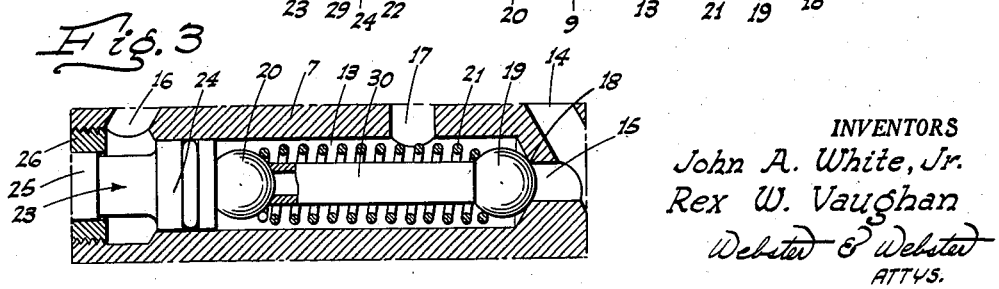
FIG. 3 is a similar but fragmentary view, showing the valve as rendered inoperative.

At times, however, it may be desirable to allow the full pump pressure to feed to the work. Means is therefore provided to enable this to be accomplished. Such means is in the form of a pin 30 to lie within the spring 21 and span between the ball valves 19 and 20; the set screw 27 being advanced to advance the plunger 23 so as to maintain the adjacent ball 20 in close engagement with the seat 22 and the adjacent end of the pin 30, and the other end of said pin in close engagement with the other ball 19 and the latter with its seat 18. As is indicated in FIG. 3, the pin 30 is preferably tubular, so as to provide for nonslip and centered engagement at its ends with the balls. The balls thus cannot be moved away from their seats, and no pressure can pass into the return passage 17.

In order to thus place the pin 30, or remove the same, it is only necessary to first remove the bushing 26, the plunger 23, and the adjacent ball 20. This will cause the plunger to be withdrawn therewith, which will expose the adjacent ball 20 for removal.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A pressure limiting valve unit comprising a body having a pair of spaced passages therethrough each adapted to be interposed in a high-pressure fluid line, an enclosed elongated chamber in the body to one side of the passages, a bypass leading from one passage intermediate its ends to one end of the chamber, a valve seat about the opening of said bypass facing into the chamber, a ball valve normally engaging the seat, another bypass leading from the other passage intermediate its ends to the periphery of the chamber at a point adjacent the other end thereof, a plunger slidable in the chamber beyond said point, a passage in the plunger leading from the periphery thereof in communication with said other bypass and terminating at the inner end of the plunger in opposed and facing relation to said valve seat, another valve seat formed in said end of the plunger about the termination of the plunger passage, a ball valve normally engaging said other seat, a loaded compression spring in the chamber extending between and engaging the opposed ball valves, a pressure relieving passage leading from the chamber between the valves, and means to control the sliding of the plunger whereby the load on the spring may be altered.

2. A valve unit, as in claim 1, in which the last named means comprises an adjustable set screw mounted in and projecting from the end of the chamber beyond the plunger in alinement therewith and rigid with the adjacent end of the same.

3. A valve unit, as in claim 1, in which the last named means comprises a bushing removably mounted in the body in axial alinement with the plunger and projecting from the adjacent side of the body for removal therefrom, the outer end portion of the plunger being slidably engaged in the inner end portion of the bushing, and an adjustable set screw threaded into the bushing from the outer end thereof in axial alinement with the plunger and rigid with the outer end of the same.

4. A valve unit, as in claim 3, with a rigid pin removably disposed between the ball valves in engagement therewith subsequent to the initial temporary removal and replacement of the bushing, plunger, and the adjacent ball valve.

5. A pressure limiting valve comprising a body having a passage therethrough adapted to be interposed in a high-pressure fluid line, an enclosed chamber in the body offset from the passage, a bypass leading from the passage intermediate its ends to one end of the chamber, a plunger slidable in the chamber beyond said one end thereof, a passage in the plunger leading from the periphery thereof in communication with the bypass to a termination at the inner end of the plunger, a valve seat in the plunger about said end of the passage, a ball valve normally engaging the seat, a loaded compression spring in the chamber bearing at one end against and holding the valve closed, a stop in the chamber engaging the other end of the spring, a bushing mounted in the body in axial alinement with the plunger and projecting outwardly from said one end of the chamber, the outer end portion of the plunger being slidably engaged in the inner end portion of the bushing, and an adjustable set screw threaded into the bushing from the outer end thereof in axial alinement with the plunger and contacting the outer end of the same.

References Cited in the file of this patent

UNITED STATES PATENTS

| | | |
|---|---|---|
| 421,573 | Jameison | Feb. 18, 1890 |
| 826,404 | Cody | July 17, 1906 |
| 908,562 | Greer | Jan. 5, 1909 |
| 953,825 | Gekeler | Apr. 5, 1910 |
| 1,797,015 | O'Conner | Mar. 17, 1931 |
| 1,958,155 | Watkins | May 8, 1934 |
| 2,496,740 | Morey | Feb. 7, 1950 |
| 2,880,747 | Newcomb | Apr. 7, 1959 |
| 3,014,497 | Rose | Dec. 26, 1961 |

FOREIGN PATENTS

| | | |
|---|---|---|
| 868,636 | Great Britain | May 25, 1961 |